United States Patent
Collet

(10) Patent No.: US 8,289,014 B2
(45) Date of Patent: Oct. 16, 2012

(54) SENSOR HOLDING DEVICE

(75) Inventor: Michel Collet, Toulouse (FR)

(73) Assignee: Continental Automotive France, Toulouse (FR)

( * ) Notice: Subject to any disclaimer, the term of this patent is extended or adjusted under 35 U.S.C. 154(b) by 501 days.

(21) Appl. No.: 12/664,170

(22) PCT Filed: May 28, 2008

(86) PCT No.: PCT/EP2008/004219
§ 371 (c)(1),
(2), (4) Date: Dec. 11, 2009

(87) PCT Pub. No.: WO2008/155005
PCT Pub. Date: Dec. 24, 2008

(65) Prior Publication Data
US 2010/0176805 A1    Jul. 15, 2010

(30) Foreign Application Priority Data
Jun. 12, 2007    (FR) ..................... 07 04158

(51) Int. Cl.
*G01B 7/30* (2006.01)

(52) U.S. Cl. ............... 324/207.25; 324/207.11

(58) Field of Classification Search .......... 324/207.25, 324/207.11
See application file for complete search history.

(56) References Cited

U.S. PATENT DOCUMENTS
2003/0231015 A1    12/2003  Spellman, Jr.
2004/0109623 A1    6/2004   Ulrici et al.
2006/0132126 A1    6/2006   Braun et al.

FOREIGN PATENT DOCUMENTS
EP    0898180    2/1999
EP    1388736    2/2004
EP    1672328    6/2006
WO    9311414    6/1993

OTHER PUBLICATIONS
International Search Report dated Jul. 23, 2008, in PCT application, PCT/EP2008/004219.

*Primary Examiner* — Reena Aurora
(74) *Attorney, Agent, or Firm* — Young & Thompson

(57) ABSTRACT

This device (6) for holding a sensor (4) or similar element in a casing (2) includes:
- two bearing tabs (18) designed to interact with the sensor (4),
- a rigid bridge (16) connecting the two bearing tabs (18),
- a holder (12) on which the rigid bridge (16) is mounted so that the rigid bridge (16) has a degree of rotational freedom and a degree of flexing freedom relative to the holder (12).

18 Claims, 2 Drawing Sheets

SENSOR HOLDING DEVICE

Figure 1:
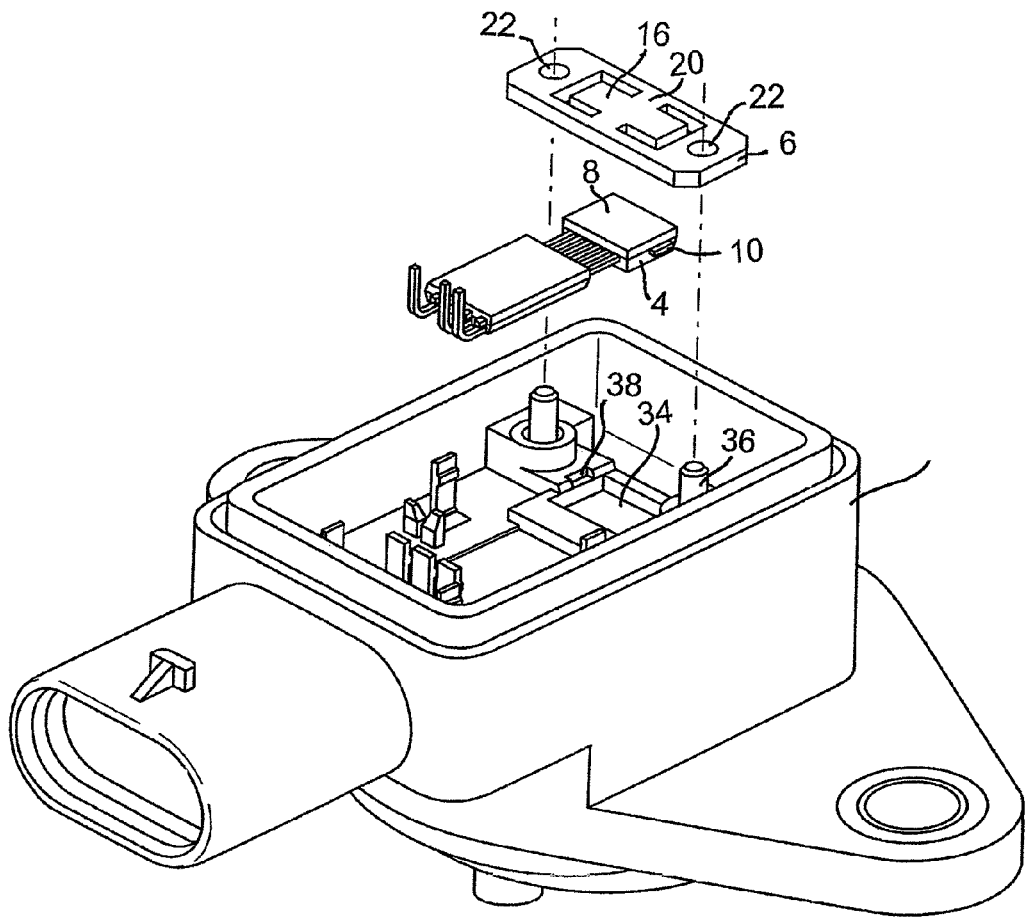

The present invention relates to a device for holding a sensor.

The present invention relates more particularly to the holding of a magnetoresistive sensor in a casing. It involves, for example, an angle sensor in the automotive field. Such a sensor, used for measuring an angular position, is found for example in document US-2003/0 231 015.

In an application such as that described in the aforementioned document, the angle sensor is mounted in a casing. The sensor used in this document, for example a sensor of the KMA 200 type, is a contactless sensor. It has holding tabs extending on either side of a cell forming the sensor itself.

To hold such a sensor in a casing, pressure is usually applied directly to the cell of the sensor. An elastic shoe is then positioned between a casing cover and the sensor in order to hold the latter. The elastic element can absorb mechanical vibrations. However, particularly when the ambient temperature varies, uncontrolled forces are applied to the cell and measurement problems can occur.

Therefore the object of the present invention is to provide a device making it possible to hold the cell better in its housing in the corresponding casing by applying thereto a force as constant as possible so as not to disrupt its measurement.

For this purpose, the present invention proposes a device for holding a sensor or similar element in a casing.

According to the present invention, this device comprises:
two bearing tabs designed to interact with said sensor,
a rigid bridge connecting the two bearing tabs,
a holder on which the rigid bridge is mounted so that the rigid bridge has a degree of rotational freedom and a degree of flexing freedom relative to the holder.

In this manner, it is possible to achieve a good pressure on the sensor while nevertheless isolating it from the external mechanical stresses due for example to vibrations or to deformations associated with temperature variations.

In such a holding device, the two bearing tabs are aligned on a first axis and the degree of flexing freedom is for example a degree of rotational freedom about this first axis. The degree of rotational freedom is, for its part, for example, a degree of freedom to rotate about a second axis substantially perpendicular to the first axis. In this manner, the axes about which there is a degree of freedom correspond substantially to the main axes of the sensor and the chosen axes therefore allow a better absorption of the various mechanical stresses.

According to a preferred embodiment of a holding device according to the invention, the holder takes the form of a plate at the center of which a cutout is made, inside which the rigid bridge is placed. In this embodiment, the holder can take the form of an elongated part and have, at its two ends, attachment zones comprising bores. The attachment zones are then, for example, connected by parallel arms between which there is the cutout housing the rigid bridge. Such an embodiment makes it possible to achieve a good flexion about the first axis mentioned above.

In this embodiment, to achieve the second degree of freedom, the rigid bridge is, for example, connected to the holder by U-shaped fixtures extending perpendicularly to the parallel arms and attached to the latter.

In a variant embodiment of the holding device according to the present invention, the bores of the attachment zones and the bearing tabs are, for example, in line.

The present invention also relates to a casing housing an angle sensor, characterized in that it contains a holding device as described above, and a casing housing an angle sensor, characterized in that it contains two parallel attachment pins, and in that a holding device, having a holder with two attachment zones each comprising a bore, is attached to said pins by heading.

Figure 2:
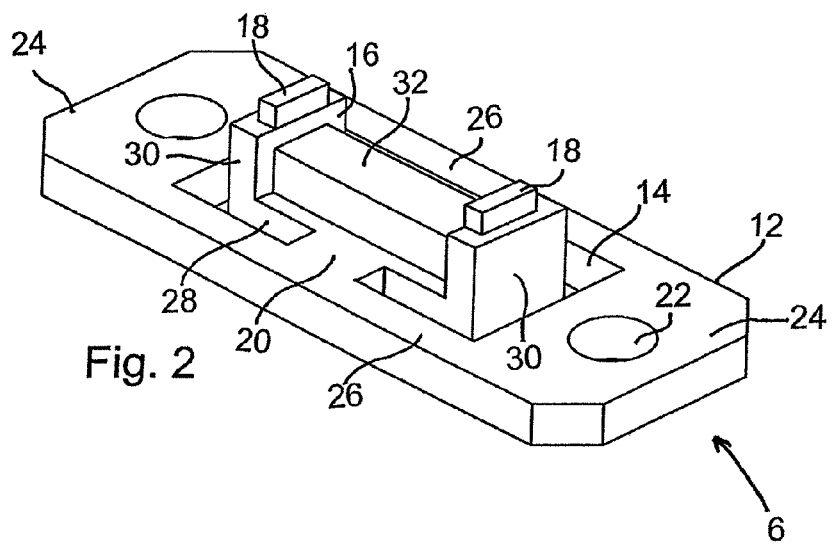
Figure 3:
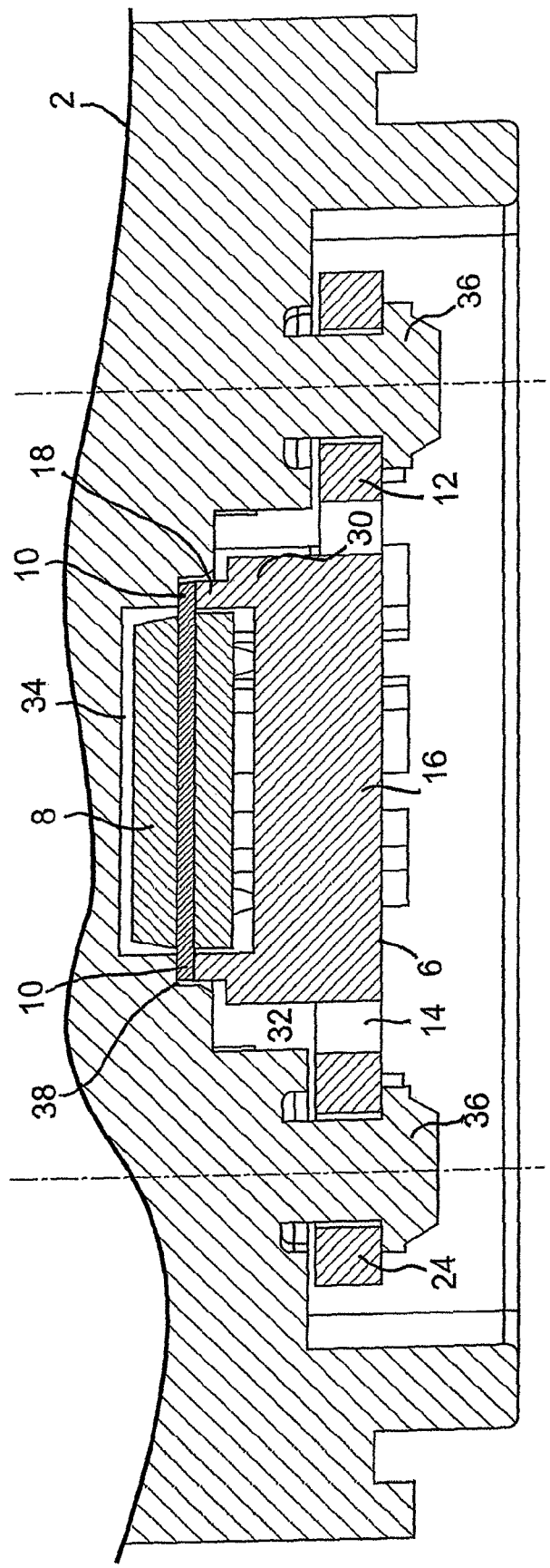

The details and advantages of the present invention will better emerge from the following description, made with reference to the appended schematic drawings in which:

FIG. 1 is an exploded view in perspective of a casing, of an angle position sensor and of a holding device according to the invention, FIG. 2 is a view in perspective on a larger scale of a holding device according to the invention, and FIG. 3 is a view in longitudinal section on a larger scale illustrating the holding, by a holding device according to the invention, of an angle sensor in a casing.

FIG. 1 shows, without a cover, a casing 2 inside which an angle position sensor 4 is placed. A holding device 6 is provided to ensure a good positioning of the sensor 4 in the casing 2.

The sensor 4 shown in FIG. 1 corresponds to a magnetic converter-sensor of the KMA 200 type. This sensor 4 has a cell 8 of substantially parallelepipedal shape. Coming out of two opposite sides of this parallelepiped are tabs 10. The latter are usually used for positioning the cell 8 of the sensor 4 in the casing 2. Such a sensor is known in the prior art.

The present invention proposes a novel device for holding the sensor 4 in the casing 2. This device is shown in greater detail in FIG. 2.

The holding device 6 as shown in FIG. 2 comprises a holder plate 12 inside which a cutout 14 is made. A rigid bridge 16 supporting two bearing tabs 18 is housed in the cutout 14 and is connected to the holder plate 12 by U-shaped fixtures 20.

Note that the holding device 6, in its preferred embodiment shown in the drawings, is made in a single piece.

The holder plate 12 is of a generally elongated rectangular shape. At its two ends, it has bores 22 extending perpendicularly to the holder plate 12. These two bores 22 are designed for attaching the holding device 6 into the casing 2 as illustrated in FIG. 3. Thus defined at both ends of the holder plate 12 on each occasion is an attachment zone 24.

The cutout 14 inside which there is the rigid bridge 16 is a rectangular cutout elongated in the same direction as the holder plate 12. Because of this cutout 14 and its central position relative to the holder plate 12, the two attachment zones 24 situated at the ends of the holder plate 12 are connected together by parallel arms 26. These arms 26 are similar to mini-beams that can work in flexion and/or torsion.

The assembly formed by the attachment zones 24 and the parallel arms 26 thus forms a plate having a certain flexibility to rotate about the main axis of the holder plate 12 that is in the plane of the latter and passing through the two bores 22. Note here that the bores 22 are placed in a symmetrical manner on the holder plate 12.

The rigid bridge 16 takes the form of a U-shaped yoke with a base 28 and two legs 30.

The base 28 extends in the plane of the holder plate 12 inside the cutout 14. The legs 30 extend perpendicularly relative to the base 28 and to the plane of the holder plate 12. The free ends of the legs support the bearing tabs 18. In order to stiffen this bridge 16, a reinforcement 32 is provided between the legs 30 of the rigid bridge 16.

As already mentioned above, the rigid bridge 16 is connected to the holder plate 12 by U-shaped fixtures 20. More precisely, these U-shaped fixtures connect the arms 26 to the base 28 of the rigid bridge 16. The U-shaped fixtures 20 are placed in a mid-position relative to the arms 26 and relative to the base 28.

The two U-shaped fixtures 20 define an axis of rotation about which the rigid bridge 16 can pivot. The section of these U-shaped fixtures is chosen so as to allow a degree of rotational freedom about the transverse axis passing through the U-shaped fixtures 20 for the rigid bridge 16. In this manner, the holding device provides two degrees of freedom for the rigid bridge 16. As has just been seen, the rigid bridge 16 can pivot about a transverse axis relative to the holder plate 12 and, as has been seen above, relative to a longitudinal axis of this holder plate 12. The rigid bridge 16 is therefore mounted with a possibility of rotating and flexing relative to the holder plate 12.

In the preferred embodiment shown in the drawings, the holding device has a symmetry relative to a midplane perpendicular to the holder plate 12. Thus, for example, the bores 22 are aligned with the tabs 18, the arms 26 and the U-shaped fixtures 20 are also symmetrical.

FIG. 3 illustrates the assembly of the sensor 4 that can be seen in the casing 2. The cell 8 of the sensor 4 is placed in a housing 34 provided for this purpose in the casing 2. On either side of this housing 34 there is each time a pin 36. When the cell 8 is placed in its housing 34, it is positioned by virtue of notches 38 that are found each time between the housing 34 and a pin 36.

The pins 36 are adapted, in their size and their position, to be placed in the bores 22 of the holding device 6. The holding device 6 is then placed on the pins 36, the bearing tabs 18 resting on the tabs 10 of the sensor 4 in the notches 38. The holding device 6 is then attached in the casing by deforming the pins 36. Thus, it is possible to carry out a heading operation on the free ends of the pins 36 in order to irremovably attach the holding device 6 in the casing 2.

In the lifetime of the sensor 4, the latter and the casing 2 are subjected to mechanical stresses due to various vibrations (the casing 2 is for example mounted in a motor vehicle) and also to thermal expansion phenomena due to variations in the ambient temperature.

By virtue of the two degrees of freedom left to the rigid bridge 16 in the holding device 6, the various mechanical stresses can be absorbed by this holding device 6. The cell 8 of the sensor 4 can then work without sustaining these stresses, which makes it possible to not reduce the lifetime of the sensor 4.

In the preferred embodiment described above, note also that the holding device is a part which can be easily manufactured and mounted in the casing 2, which makes it possible, while having a better hold, to have a cost price similar to that of the known solutions of the prior art.

The present invention is not limited to the preferred embodiment described above as a nonlimiting example. It also relates to the variant embodiments within the scope of those skilled in the art.

Therefore, for example, the holding device described above is made in a single piece. It could be envisaged to have several pieces and for example a holder separate from the rigid bridge.

Similarly, the part described above is a symmetrical part which favors the distribution of the forces but other shapes can be envisaged. Therefore instead of having, for example, two arms connecting the attachment zones, a single arm could be provided, for example. It would also be possible to envisage having only one U-shaped fixture to connect the rigid bridge to the holder plate.

Naturally, different embodiments can be envisaged in order to adapt to different casings and to other shapes of sensors.

The invention claimed is:

1. A device (6) for holding a sensor (4) or similar element in a casing (2), characterized in that it comprises:
    two bearing tabs (18) designed to interact with said sensor (4),
    a rigid bridge (16) connecting the two bearing tabs (18),
    a holder (12) on which the rigid bridge (16) is mounted so that the rigid bridge (16) has a degree of rotational freedom and a degree of flexing freedom relative to the holder (12).

2. The holding device as claimed in claim 1, characterized in that the two bearing tabs (18) are aligned on a first axis, and in that the degree of flexing freedom is a degree of rotational freedom about this first axis.

3. The holding device as claimed in claim 2, characterized in that the degree of rotational freedom is a degree of freedom to rotate about a second axis substantially perpendicular to the first axis.

4. The holding device as claimed in claim 2, characterized in that the holder (12) takes the form of a plate at the center of which a cutout (14) is made, inside which the rigid bridge (16) is placed.

5. The holding device as claimed in claim 4, characterized in that the holder (12) takes the form of an elongated part, in that the holder (12) has, at its two ends, attachment zones (24) comprising bores (22), and in that the attachment zones (24) are connected by parallel arms (26) between which there is the cutout (14) housing the rigid bridge (16).

6. The holding device as claimed in claim 3, characterized in that the holder (12) takes the form of a plate at the center of which a cutout (14) is made, inside which the rigid bridge (16) is placed.

7. The holding device as claimed in claim 6, characterized in that the holder (12) takes the form of an elongated part, in that the holder (12) has, at its two ends, attachment zones (24) comprising bores (22), and in that the attachment zones (24) are connected by parallel arms (26) between which there is the cutout (14) housing the rigid bridge (16).

8. The holding device as claimed in claim 6, characterized in that the rigid bridge (16) is connected to the holder (12) by U-shaped fixtures (20) extending perpendicularly to the parallel arms (26) and attached to the latter.

9. The holding device as claimed in claim 1, characterized in that the holder (12) takes the form of a plate at the center of which a cutout (14) is made, inside which the rigid bridge (16) is placed.

10. The holding device as claimed in claim 9, characterized in that the holder (12) takes the form of an elongated part, in that the holder (12) has, at its two ends, attachment zones (24) comprising bores (22), and in that the attachment zones (24) are connected by parallel arms (26) between which there is the cutout (14) housing the rigid bridge (16).

11. The holding device as claimed in claim 10, characterized in that the bores (22) of the attachment zones (24) and the bearing tabs (18) are in line.

12. The casing (2) housing an angle sensor (4), characterized in that it contains two parallel attachment pins (36), and in that a holding device (6) as claimed in claim 10 is attached to said pins (36) by heading.

13. The casing (2) housing an angle sensor (4), characterized in that it contains two parallel attachment pins (36), and in that a holding device (6) as claimed in claim 11 is attached to said pins (36) by heading.

14. The holding device as claimed in claim 10, characterized in that the rigid bridge (16) is connected to the holder (12) by U-shaped fixtures (20) extending perpendicularly to the parallel arms (26) and attached to the latter.

15. The holding device as claimed in claim 14, characterized in that the bores (22) of the attachment zones (24) and the bearing tabs (18) are in line.

16. The casing (2) housing an angle sensor (4), characterized in that it contains two parallel attachment pins (36), and in that a holding device (6) as claimed in claim 14 is attached to said pins (36) by heading.

17. The holding device as claimed in claim 15, characterized in that the bores (22) of the attachment zones (24) and the bearing tabs (18) are in line.

18. A casing (2) housing an angle sensor, characterized in that it contains a holding device (6) as claimed in claim 1.

* * * * *